United States Patent [19]

Huang

[11] Patent Number: 5,397,162

[45] Date of Patent: Mar. 14, 1995

[54] SADDLE FOR A BICYCLE

[76] Inventor: Yeong-Li Huang, No. 347, Sec. 2, Chung-Cheng Rd., Chang-Hua City,

[21] Appl. No.: 217,639

[22] Filed: Mar. 25, 1994

[51] Int. Cl.⁶ .............................................. B62J 1/00
[52] U.S. Cl. .................................. 297/195.1; 40/320; 297/219.11; 297/452.61; 297/463.2; 297/215.16
[58] Field of Search ................ 297/195.1, 215.16, 217, 297/219.1, 219.11, 452.1, 452.56, 452.61, 452.62, 463, DIG. 2; 40/320, 661

[56] References Cited

U.S. PATENT DOCUMENTS

| | | | |
|---|---|---|---|
| 4,319,781 | 3/1982 | Tsuge | 297/219.11 X |
| 4,451,083 | 5/1984 | Marchello | 297/195.1 X |
| 4,627,660 | 12/1986 | Kon | 297/452.61 |
| 5,271,662 | 12/1993 | Saul | 297/219.1 |

FOREIGN PATENT DOCUMENTS 824898 12/1951 Germany ........................... 297/195.1

Primary Examiner—Peter R. Brown
Attorney, Agent, or Firm—Oblon, Spivak, McClelland, Maier & Neustadt

[57] ABSTRACT

A saddle includes an injected saddle body made of a composite material, a flexible decorative sheet, and a transparent and soft elastic covering. The saddle body has a top wall and a surrounding wall which projects from a peripheral portion of the top wall. The decorative sheet is in the form of a thin fiber layer which is adhered closely to the outer surfaces of the top and surrounding walls of the saddle body, and includes a decorative unit which is attached to an outer surface of the thin fiber layer. The outer surface of the surrounding wall of the saddle body has an embossed decorative portion of a predetermined shape beneath the decorative sheet so as to provide the decorative unit of the decorative sheet with a three-dimensional visual effect. The transparent, soft elastic covering is attached closely to the outer surface of the thin fiber layer of the decorative sheet and is located over the decorative unit.

1 Claim, 4 Drawing Sheets

SADDLE FOR A BICYCLE

BACKGROUND OF THE INVENTION

1. Field of the Invention

This invention relates to a saddle for a bicycle, more particularly to saddle which has a decorative sheet that is adhered closely to an outer surface of the saddle body of the saddle, and a transparent covering that is attached closely to an outer surface of the decorative sheet so as to prevent scraping off of the decorative sheet and so as to enhance the aesthetic appeal of the saddle.

2. Description of the Related Art

This invention is an improvement of a conventional saddle 10, as shown in FIG. 1, which is used for a bicycle. The saddle includes a saddle body 11, a foam layer 12, and a covering 13. The saddle body 11 is made of a hard elastic material and is coated with the foam layer 12. Then, the foam layer 12 is coated with the covering 13. However, since the covering 13 is usually made of leather, wearing of the covering 13 occurs after long-term use, thereby making it inconvenient to mount the covering 13 on the saddle.

In the conventional saddle, a decorative mark or a trademark may be embossed on an outer surface of the covering 13. It is noted that the decorative mark or the trademark is easily scraped off if attached in this manner. In addition, the decorative mark or the trademark, when embossed on the outer surface of the covering 13, cannot provide a three-dimensional visual effect.

SUMMARY OF THE INVENTION

The main objective of this invention is to provide a saddle which has an embossed decorative mark on an outer surface of the saddle body of the saddle, and a transparent and soft elastic covering that is mounted over the saddle body, thereby preventing scraping off of the embossed decorative mark and providing the embossed decorative mark with a three-dimensional visual effect.

According to this invention, a saddle includes an injected saddle body made of a composite material, a flexible decorative sheet, and a transparent and soft elastic covering. The saddle body has a top wall and a surrounding wall which projects from a peripheral portion of the top wall. The decorative sheet is in the form of a thin fiber layer which is adhered closely to the outer surfaces of the top and surrounding walls of the saddle body, and includes a decorative unit which is attached to an outer surface of the thin fiber layer. The outer surface of the surrounding wall of the saddle body has an embossed decorative portion of a predetermined shape beneath the decorative sheet so as to provide the decorative unit of the decorative sheet with a three-dimensional visual effect. The covering is attached closely to the outer surface of the thin fiber layer of the decorative sheet and is located over the decorative unit.

BRIEF DESCRIPTION OF THE DRAWING

Other features and advantages of this invention will become apparent from the following detailed description of the preferred embodiment of this invention, with reference to the accompanying drawings, in which.

DETAILED DESCRIPTION OF THE PREFERRED EMBODIMENT

Figure 1:
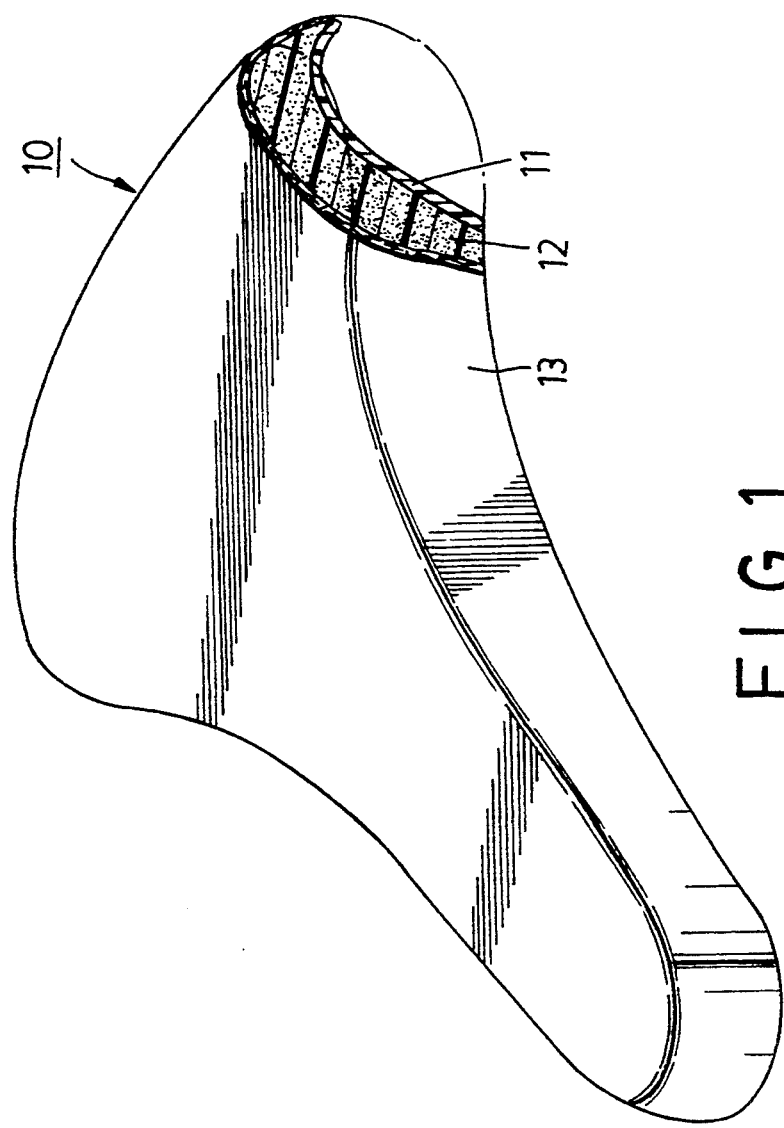
FIG. 1 is a partly sectional perspective view of a conventional saddle.
Figure 2:
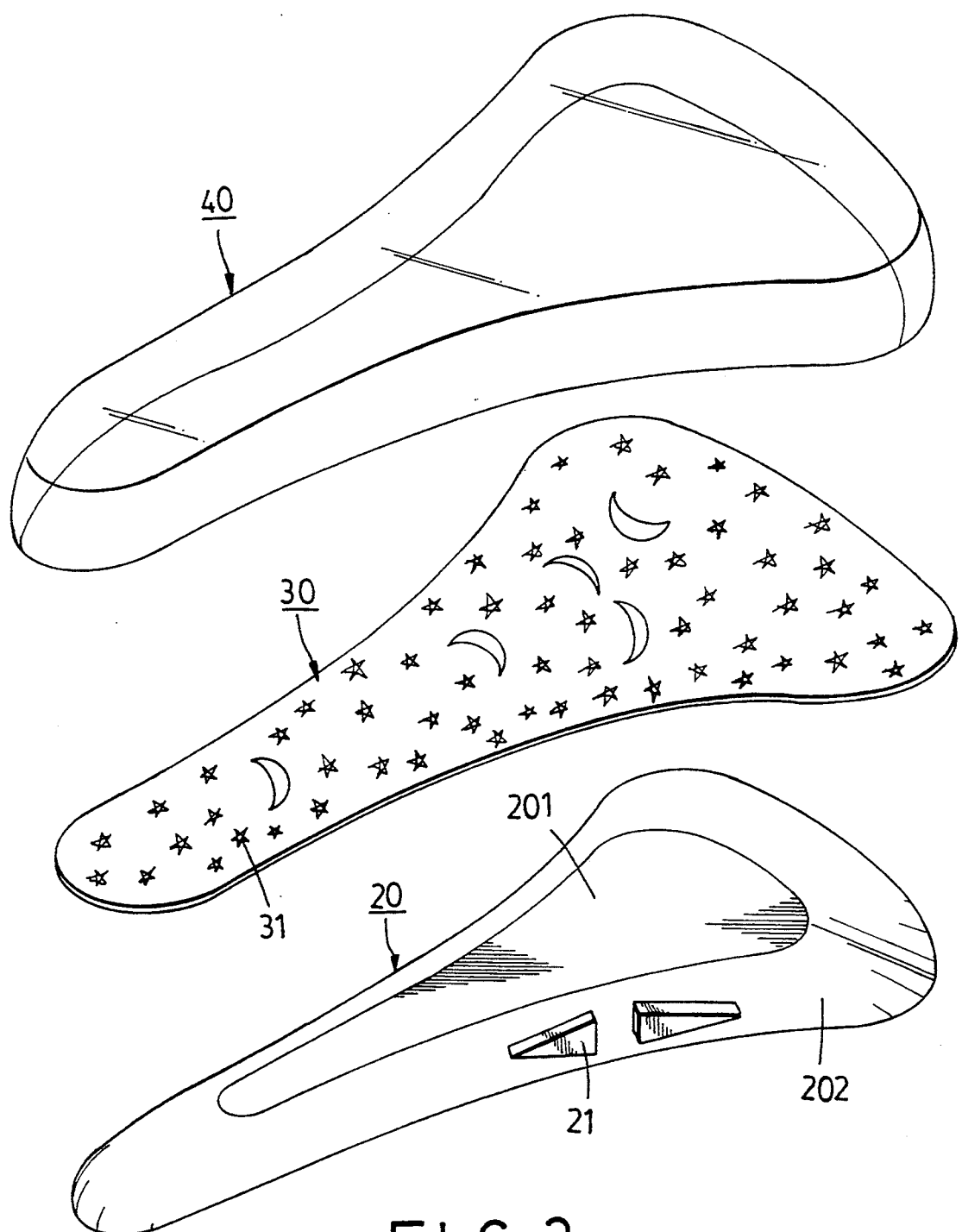
FIG. 2 is an exploded view showing a saddle of the preferred embodiment of this invention.

Referring to FIG. 2, a saddle of the preferred embodiment of this invention includes an injected saddle body 20 made of a composite material, a flexible decorative sheet 30, and a transparent and soft elastic covering 40.

Figure 4:
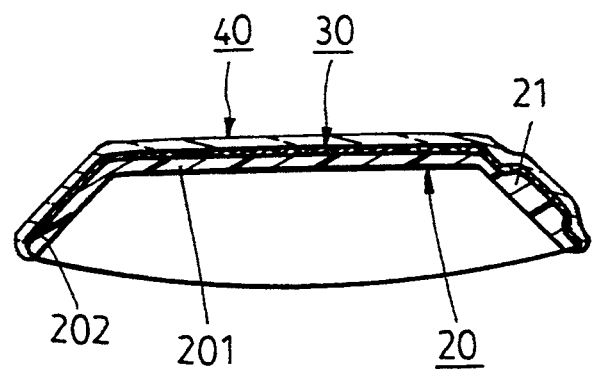
FIG. 4 is a sectional view showing the saddle according to the preferred embodiment of this invention.

Referring to FIGS. 2 and 4, the saddle body 20 has a top wall 201 and a surrounding wall 202 that project from a peripheral portion of the top wall 201. When the saddle body 20 is formed within a mold unit by an injection molding machine (not shown) in a known manner, an injection nozzle of the mold unit is located at the bottom surface of the saddle body 20 so as to provide a plain outer surface for the saddle body 20. Owing to being molded from a composite material, the saddle body 20 has an appropriate hardness so as to support the weight of a rider and provide good shock absorbing effect.

The decorative sheet 30 is in the form of a thin fiber layer, such as a carbon fiber layer, which is adhered closely to the outer surfaces of the top and surrounding walls 201, 202 of the saddle body 20. The decorative sheet 30 has a decorative unit 31 which is attached to the outer surface of the thin fiber layer thereof. The decorative unit 31 may be a sticker which has a trademark or a design thereon. In addition, the decorative unit 31 can be several patterns or decorative marks engraved on the outer surface of the thin fiber layer of the decorative sheet 30. The outer surface of the surrounding wall 202 of the saddle body 20 has an embossed decorative portion 21 of a predetermined shape beneath the decorative sheet 30 so as to provide the decorative unit 31 of the decorative sheet 30 with a three-dimensional visual effect. The embossed decorative portion 21 can also be manufactured in the form of a trademark.

Figure 3:
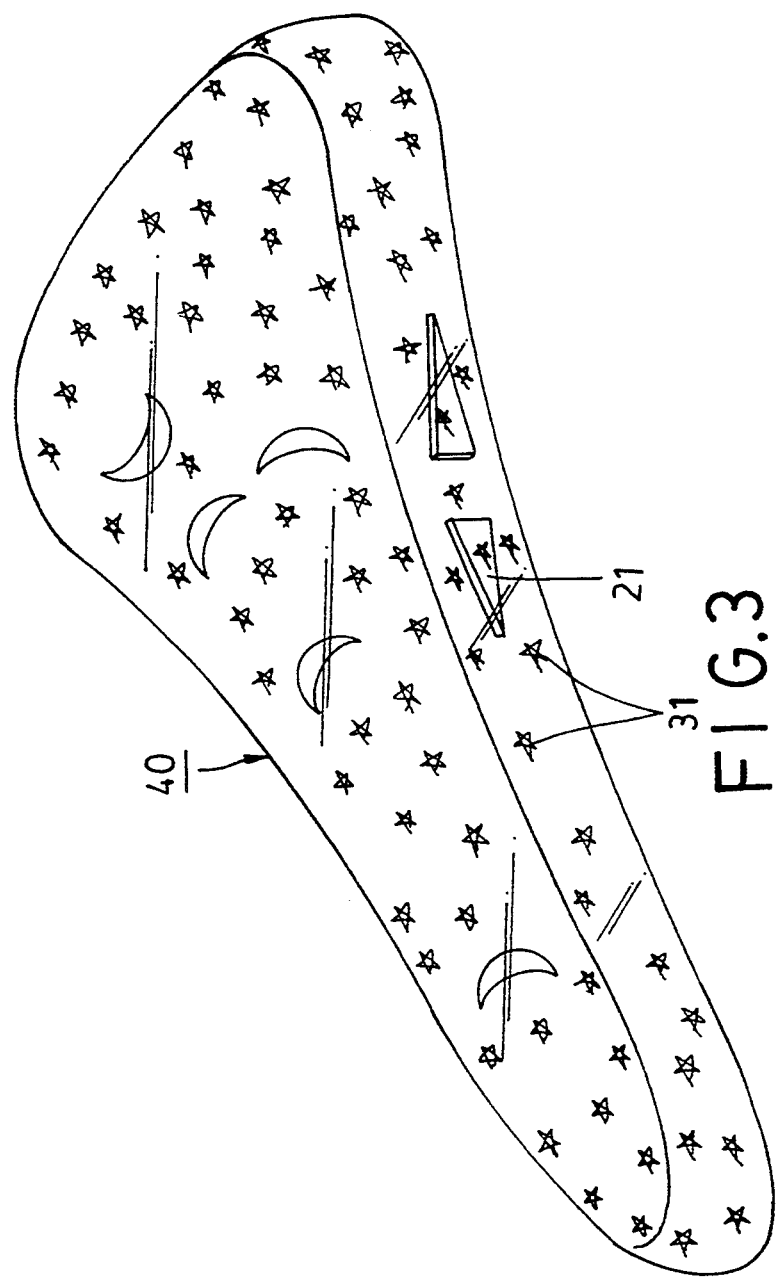
FIG. 3 is a perspective view of the saddle of the preferred embodiment of this invention.

The covering 40 is attached closely to the outer surface of the thin fiber layer of the decorative sheet 30 and is located over the decorative unit 31, as shown in FIG. 3. Owing to being made of a transparent and soft elastic material, the covering 40 can provide comfort to the rider during use, can allow the embossed decorative portion 21 and the decorative unit 31 to be seen clearly, and does not wear easily even after long-term use. Preferably, the covering 40 can effectively prevent the decorative sheet 30 and the embossed decorative portion 21 from being scrapped off. In addition, the saddle can be manufactured rapidly by the known injection molding techniques, and is quite firm in construction. Accordingly, not only can the manufacturing cost of the saddle be reduced, but the decorative unit 31 and the embossed decorative portion 21 also enhance the aesthetic appeal of the saddle.

With this invention thus explained, it is apparent that numerous modifications and variations can be made without departing from the scope and spirit of this invention. It is therefore intended that this invention be limited only as indicated in the appended claim.

I claim:

1. A saddle for a bicycle, comprising:

an injected saddle body made of a composite material and having a top wall and a surrounding wall that projects from a peripheral portion of said top wall;

a flexible decorative sheet which is in the form of a thin fiber layer that is adhered closely to outer surfaces of said top and surrounding walls of said saddle body, and which includes a decorative unit that is attached to an outer surface of said thin fiber layer, said outer surface of said surrounding wall of said saddle body having an embossed decorative portion of a predetermined shape beneath said decorative sheet so as to provide said decorative unit of said decorative sheet with a three-dimensional visual effect; and a transparent, soft elastic covering attached closely to said outer surface of said thin fiber layer of said decorative sheet and located over said decorative unit.

* * * * *

UNITED STATES PATENT AND TRADEMARK OFFICE
CERTIFICATE OF CORRECTION

PATENT NO. : 5,397,162
DATED      : March 14, 1995
INVENTOR(S): Yeong-Li HUANG

It is certified that error appears in the above-indentified patent and that said Letters Patent is hereby corrected as shown below:

On the title page, Item [76], the inventorship should read:

--Yeong-Li Huang, No. 347, Sec. 2, Chung-Cheng Rd., Chang-Hua City, Taiwan--

Signed and Sealed this

Thirtieth Day of May, 1995

Attest:

BRUCE LEHMAN

*Attesting Officer*         *Commissioner of Patents and Trademarks*